Dec. 11, 1945.  R. H. ABBOTT ET AL  2,390,675
DRYING AND CALCINING FURNACE
Filed June 5, 1942  3 Sheets-Sheet 1

THOMAS A. DICKSON
ROBERT H. ABBOTT
INVENTOR.

BY Martin E. Anderson

Dec. 11, 1945.    R. H. ABBOTT ET AL    2,390,675
DRYING AND CALCINING FURNACE
Filed June 5, 1942    3 Sheets-Sheet 2

THOMAS A. DICKSON
ROBERT H. ABBOTT
INVENTOR.

BY Martin E. Anderson

Dec. 11, 1945.  R. H. ABBOTT ET AL  2,390,675
DRYING AND CALCINING FURNACE
Filed June 5, 1942  3 Sheets-Sheet 3

THOMAS A. DICKSON
ROBERT H. ABBOTT,
INVENTOR.

BY Martin E. Anderson

Patented Dec. 11, 1945

2,390,675

UNITED STATES PATENT OFFICE 2,390,675

DRYING AND CALCINING FURNACE

Robert H. Abbott and Thomas A. Dickson, Denver, Colo., assignors to Colorado Iron Works Company, Denver, Colo., a corporation of Maine Application June 5, 1942, Serial No. 445,950

2 Claims. (Cl. 259—107)

This invention relates to improvements in multiple hearth calcining furnaces and the like.

In chemical factories and more especially in sugar factories, a large amount of carbon dioxide is required to carry out some of the reactions. The carbon dioxide is nearly always obtained by heating calcium carbonate ($CaCO_3$) until disassociation takes place with the production of lime ($CaO$) and carbon dioxide ($CO_2$). The lime is afterwards employed in such a way that it becomes hydrated and then precipitated by the action of carbon dioxide as ($CaCO_3$) which is referred to herein as lime mud or lime cake.

Formerly the lime mud ($CaCO_3$) was discarded as waste and the carbon dioxide obtained from fresh limestone.

In U. S. Patent 2,225,119 granted December 17, 1940, an apparatus is described by means of which the lime mud or cake that was formerly discarded as waste, and which chemically is the same form as limestone, can be calcined with the production of more carbon dioxide and lime.

The lime mud or cake resulting from the carbonating step of a beet sugar process, or from some other carbonating process, is calcined in a multiple hearth furnace of the construction described and claimed in the above identified patent or in some similar apparatus.

The lime mud recovered by filtration contains a large percentage of water, and is quite sticky when it is introduced onto the drying hearth of the furnace.

Lime mud, when acted on by rabble blades, will adhere to the blades and build up in front of the blades forming large masses or cakes that slide on the hearth thus making operation impossible.

In the ordinary multiple hearth roasting and calcining furnaces, either four or two rabble arms are provided for each hearth. The rabble arms are provided with inclined rabble blades that move the material either inwardly or outwardly the distance of their effective widths, which is their projections on a plane parallel to the axis of the arm. If two arms are used the blades of the second arm are staggered with respect to those on the first arm, the paths of the blades must overlap to some extent as will hereinafter appear, and moves the material radially into a position where it will be engaged by the second blade on the first arm which moves it radially another similar distance; this is continued until the material reaches the desired position radially when it drops through suitable openings onto the hearth below.

If more than two arms are used the blades are similarly spaced and positioned wherefore if four arms are employed the material will move radially twice as fast as when two arms are employed.

It has been determined that the above described ordinary arrangement of rabble blades cannot be used for rabbling wet lime cake or mud. It has previously been found that ore concentrates prepared by the flotation process, are very sticky and difficult to handle and Pomeroy in U. S. Patent 1,251,692 employed rotary disks instead of the ordinary rabble blades.

It is the object of this invention to produce a calcining or roasting furnace of such construction that sticky material, like lime mud or flotation concentrate can be successfully rabbled by means of the usual blades attached to the ordinary rabble arms.

It has been found that by increasing the spacing between the rabble blades along the arms to two or more times the effective width of the blades, the accumulation of mud can be prevented because by sufficiently increasing the length of the mud beam or arch, it will break before the resistance to sliding along the hearth surface is overcome.

The objects of this invention are attained by the simple expedient of increasing the distance between the blades on each arm to such an extent that the damp and sticky material will break before it can bridge the space and at the same time make it possible to employ blades of the usual effective width. The arrangement requires at least three rabble arms and the blades are so positioned that the distance between the blades on each arm equals the product of the number of arms (greater than two) times the effective width of the blades minus the overlap. If six arms are used and the effective width of a blade is eight inches with an overlap of one inch, then the blades on each arm will be spaced 6 (8—1) or 42 inches apart instead of seven inches in the usual arrangement like that shown in U. S. Patents 1,465,417 and 1,265,964.

Since the material must be moved radially on the hearth surface, it is necessary to so position the blades on the several arms that the material that passes through the space between adjacent blades on one arm will be shifted radially a predetermined distance by the blades of a following arm.

Having thus explained the principal object of the invention and in a general way the means by which the desired results are obtained the apparatus and the manner in which it functions, will now be described in greater detail and for this purpose reference will be had to the accompanying drawings in which the invention has been illustrated in its preferred form, and in which.

Figure 1:
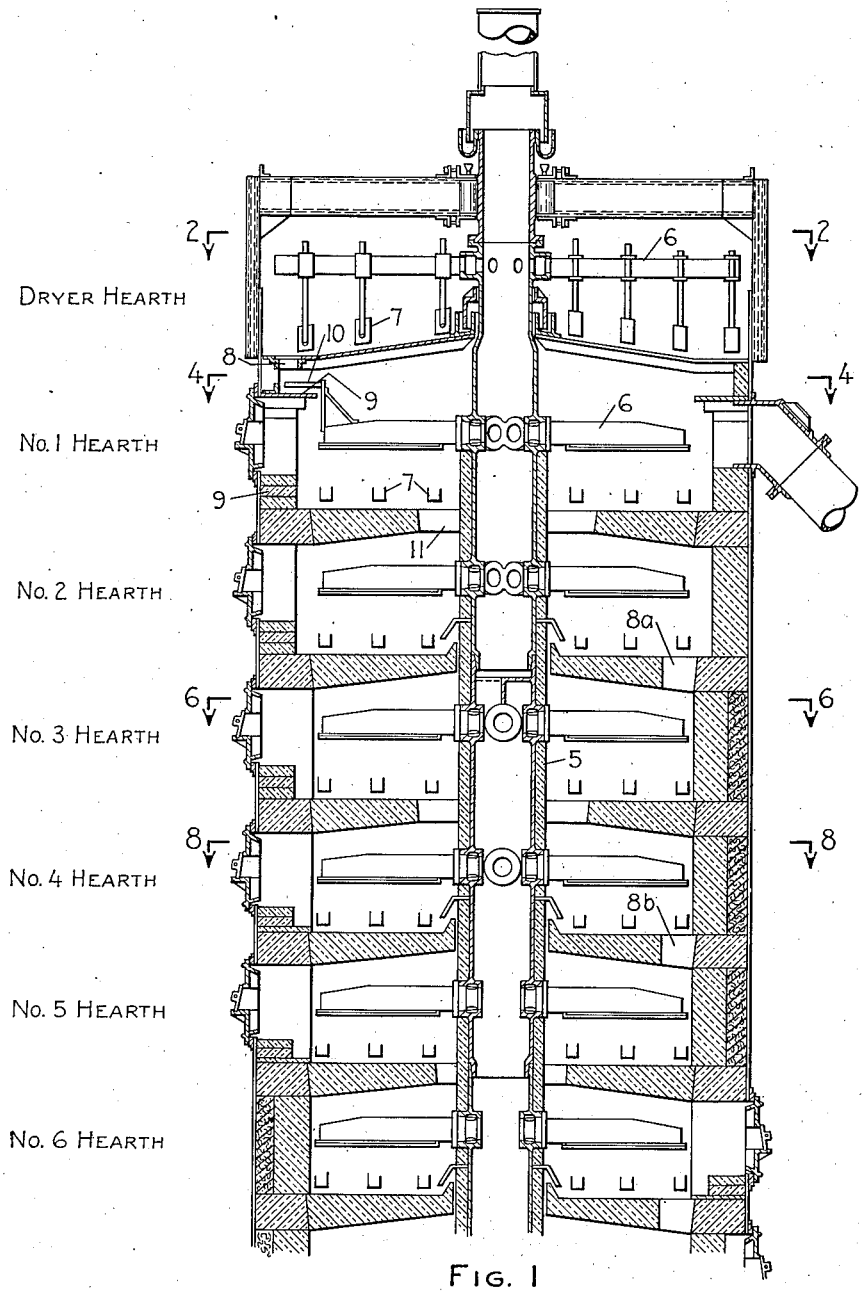
Figure 1 is a diametrical section through a multiple hearth drying and calcining furnace showing the arrangement and relative positions of the several parts.

Figure 1 of the drawings shows a vertical diametrical section through a roasting and calcining furnace of the type to which this invention relates. The part designated by reference numeral 5 is a hollow rabble shaft from which the hollow rabble arms 6 radiate. Secured to the rabble arms are rabble blades 7 which have been indicated more or less diametrically in the drawing. The material is fed to the upper or dryer hearth near the center thereof, in a moist condition, and when the rabble shaft rotates, the blades 7 move the material outwardly and finally discharge it through openings 8 onto the shelf 9 on hearth number 1 from which it is removed by the scraper arm 10 and falls onto the hearth near its circumference and is then moved inwardly by the rabble blades 7 and discharged through the opening 11 onto the number 2 hearth. The rabbling continues until the material is fully roasted or calcined as the case may be.

As above mentioned, when the material to be roasted or calcined is in the form of a moist cake, such as lime mud or wet flotation concentrate, it will adhere to the rabble blades and if the latter are not properly spaced, it will merely form cakes in front of the rabble blades and will slide along the floor of the drying hearth instead of being progressively moved radially by the action of the blades.

In order to effect a successful operation, the rabble blades have to be spaced far enough apart along the rabble arms in the upper drying hearth to prevent the caking or bridging action referred to and the peculiar arrangement of blades to effect the desired results will now be described.

Figure 2:
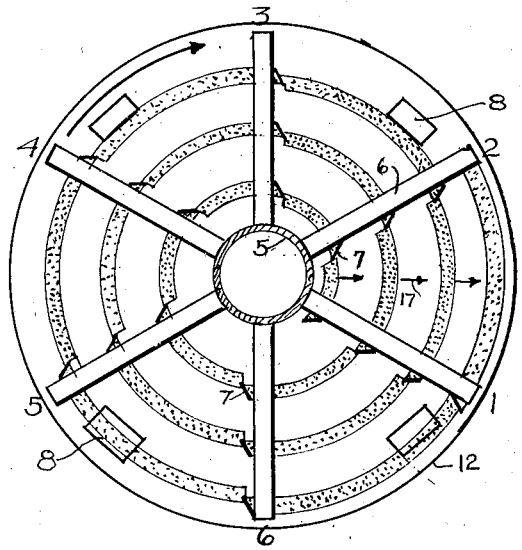
Figure 2 is a top plan view showing the rabble arms and blades as they appear when viewed through plane 2—2, Figure 1.
Figure 3:
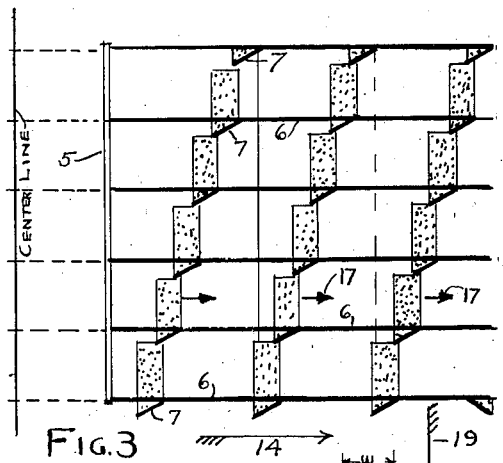
Figure 3 is a diagrammatic representation of the rabble arm and blade shown in Figure 2 arranged for out hearth movement.
Figure 5:
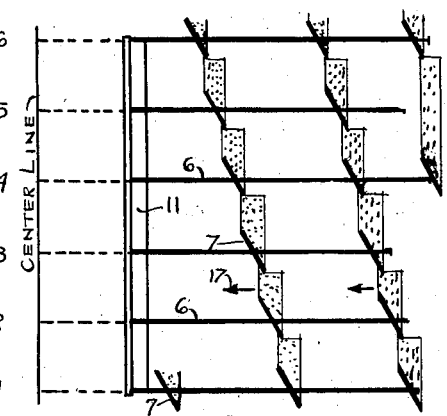
Figure 5 is a view similar to that shown in Figure 3, showing the blades arranged for in hearth movement.
Figure 3A:
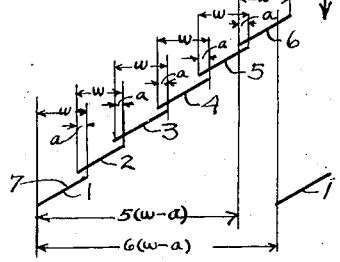
Figure 3A is another diagram showing the arrangement of the blades, their relative positions and their spacings.

Referring now more particularly to Figures 2 and 3, the former of which is a view looking through plane 2—2, in Figure 1, shows six rabble arms radiating from the hollow rabble shaft 5. The drying hearth is provided with six openings 8 through which the material that is fed to the hearth near the center, is discharged into the number one hearth of the furnace. The arms have been shown as rotating in a clockwise direction and the blades 7 have been shown as attached to the rabble arms in front of their axes and inclined with respect to the latter at an angle of thirty degrees. The arms have been numbered consecutively in a counterclockwise direction from 1 to 6. The paths of the blades have been indicated by stippled areas which merely show the paths over which the blades have passed and which may be supposed to be cleared of material, the latter occupying the blank spaces between the stippled areas. If we assume that material is fed near the center the blade on arm 1, which is nearest the center, will move the material outwardly a distance equal to the effective width of the blade which will be indicated by reference letter $w$. The innermost blade on arm 2 is positioned so that it overlaps the path of the inner blade on arm 1 a short distance, and this in turn moves the material outwardly another distance $w$. Each blade in succession effects an outwardly radial movement of the material which occupies a spiral position from the center towards the wall 12 of the furnace. It will be apparent from an inspection of Figure 2 that the blades are spaced far apart along the arms as compared to the ordinary spacing and in Figure 3 the arrangement of blades has been shown in a diagrammatic manner with the arms arranged in parallel position, and positioned to travel downwardly in the direction of arrow 13, the blades being arranged so as to move the material outwardly or in the direction indicated by arrow 14. It will be seen that the path of the innermost blade on arm 1 is overlapped slightly by the innermost blade on arm 2 and this relation continues until the sixth arm is reached, and the innermost blade on arm 6 overlaps the path of the second blade on arm 1, as shown in Figure 3. It is thus apparent that it takes the combined action of six blades to move the material the distance between adjacent blades on the arms. In order to make this relationship clear a diagram is shown in Figure 3A in which the relative positions of the correspondingly positioned blades of the several arms are shown in condensed form so as to make their relationship more apparent. We will assume that the blades are the innermost blades on each arm and that the numerals 1 to 6 designate the number of the arm to which the blade is attached. The effective width of the blades has been designated by the letter $w$ and the amount of overlap by letter $a$. It will be observed that there are two blades numbered 1 and these are intended to be adjacent blades on arm number 1. From Figure 3A, it will be readily seen that the distance between adjacent blades on each arm is equal to six times the difference between the width of the blades and the amount of overlap. In other words the distance between blades is equal to the number of arms times the difference between the width of the blades and the amount of overlap.

Figure 12:
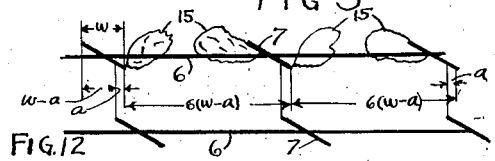
Figure 12 is a view showing the blade spacing when six arms are employed.
Figure 11:
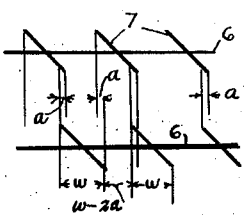
Figure 11 is a diagram showing the ordinary blade spacings on rabble arms.

The usual arrangement of blades has been diagrammatically shown in Figure 11 where the spacing of the blades is twice the difference between the width of the blades and the overlap and this leaves a clear space which is less than the width of the blade by two times the amount of overlap. The spacing shown in Figure 11 has proven to be unsuited for use when the material to be dried and rabbled is in the form of a moist flotation ore or lime mud, whereas when the blades are spaced as shown in Figures 2, 3 and 3A the distance between adjacent blades become so great that the material will not slide on the hearth bottom but will break in the manner indicated in Figure 12, where the lumps of material that pass between the blades have been indicated by reference numeral 15. The two diagrams numbered Figure 3A and Figure 12 are for hearths having six rabble arms.

Figure 4:
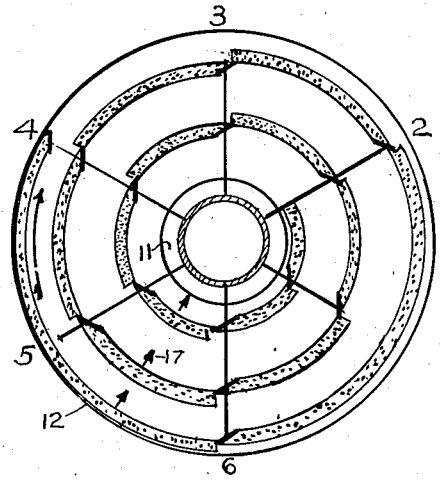
Figure 4 is a view similar to that shown in Figure 2, looking through plane 4—4, in Figure 1, and shows the blades arranged for in hearth movement.
Figure 6:
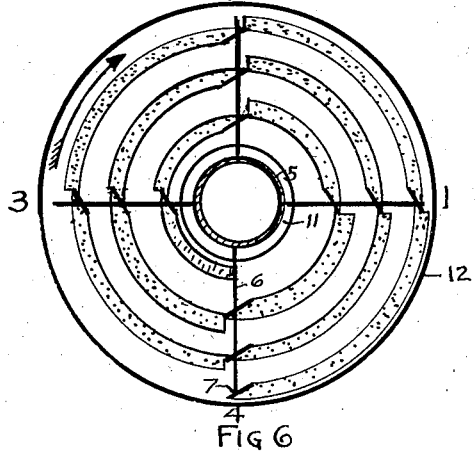
Figure 6 is a view similar to that shown in Figure 4, looking through plane 6—6, Figure 1, and shows a four arm rabble with blades arranged for in rabbling.
Figure 8:
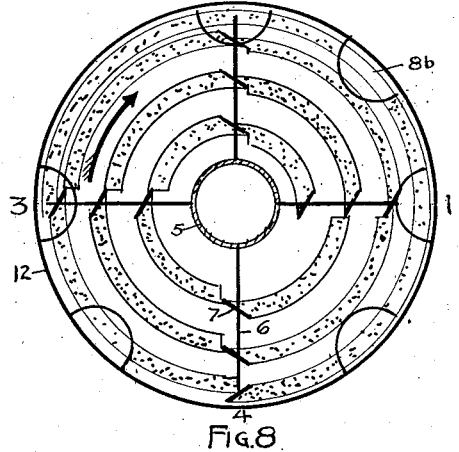
Figure 8 is a view looking through plane 8—8, in Figure 1 and shows a four arm rabble arranged for out rabbling.
Figure 7:
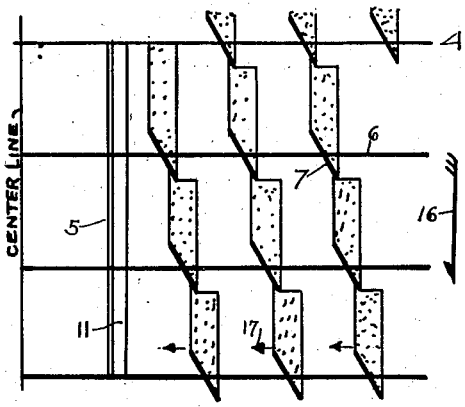
Figure 7 is a diagrammatic arrangement of the arms and blades shown in Figure 6, the arms being arranged parallel.
Figure 9:
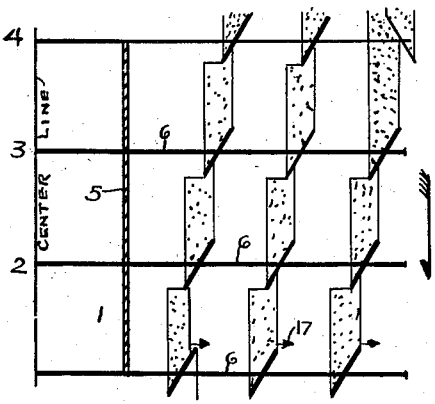
Figure 9 is a view similar to that shown in Figure 7, corresponding to the arrangement shown in Figure 8.
Figure 10:
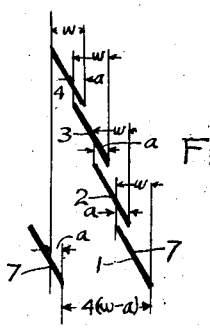
Figure 10 is a view similar to that shown in Figure 3A, arranged to show the spacing of the blades on the arms of a four arm rabble.

Figure 4 is substantially the same as Figure 2 with the exception that the arms have been shown by single lines and the blades have been inclined in the opposite direction so as to move the material inwardly and discharge it through the opening 11 onto hearth No. 2 where a similar arrangement of rabble arms and blades moves the material outwardly and discharges it through openings 8a onto the hearth No. 3 in which four rabble arms are employed instead of the six shown in the upper hearths. The four rabble arms are spaced ninety degrees apart and are each provided with blades that are so inclined as to move the material inwardly towards the opening 11. The relationship of the blades is substantially the same as that illustrated in Figure 2. In Figure 7 the four arms shown in Figure 6 have been arranged in parallel relation with the blades in the relative position shown in Figure 6. When the arms rotate the corresponding movement has been designated by arrow 16 in Figure 7 and this produces a movement of the material towards the left as indicated by the short arrows 17, the material being finally discharged through the opening 11 onto the floor of hearth 4 where it is engaged by blades inclined in the opposite direction as shown in Figure 8 and finally discharged through opening 8b onto the floor of hearth 5. The above arrangement of alternate in and out hearths can be continued as long as necessary, but after the material has become thoroughly dried, the ordinary arrangement of blades and rabble arms can be substituted because the danger of clogging will then have passed.

When the material under treatment is very moist and sticky, as, for example, lime mud or lime cake, the wide spacing between the blades on the rabble arms must be continued for a considerable distance downwardly, but with material that is less inclined to "ball up" and form big masses in front of the blades and which therefore dries quickly and becomes more friable than lime mud, the wide spacing can be discontinued sooner.

It is evident that in order to obtain the necessary wide spacing between the blades more than two rabble arms for each hearth must be employed because if only two are employed, the blades must be arranged in the manner shown in Figure 11 which leaves too small a clearance for satisfactory operation. Even where three arms are employed the spacing is still too close to operate successfully with lime mud although it may be sufficient for some kinds of ore pulp and it is only when three or a larger number of arms are employed in each hearth that the necessary wide spacing for satisfactory operation is obtained.

From the above description it will be apparent that by increasing the number of rabble arms so that there are at least three arms for each hearth, and preferably from four to six, arranging them so that the paths of the blades overlap the paths of the corresponding blades on the arm immediately in advance, and then spacing the blades on each arm a distance equal to the width of the blades minus the overlap multiplied by the number of arms, an apparatus is obtained in which the moist mud or ore will not "ball up" in front of the blades and slide on the hearth, but will break up and travel radially. With the apparatus described, no clod crusher is required because the material is subjected to a continuous breaking action.

The material to be dried, calcined or roasted is of such consistency that it is pumped onto the drying hearth.

Having described the invention what is claimed as new is:

1. In a furnace for drying and calcining lime mud, a substantially horizontal hearth, a rotatable shaft extending vertically through the hearth, at least three rabble arms extending radially from the shaft, each arm having a plurality of equally spaced rabble blades projecting downwardly towards the hearth, means for securing the blades to the arms and for holding them in a predetermined fixed relation thereto during operation, the blades on the several arms being inclined in the same direction relative to the axes of the arms and the direction of rotation, the blades being so positioned that the path of the blades on each arm will overlap the paths of the corresponding blades on the arm immediately in advance, the blades on each arm being so spaced that the distance between corresponding points on adjacent blades will be substantially equal to the effective width of the blades minus the overlap multiplied by the number of arms, whereby a continuous radial displacement of the lime mud is effected with a blade spacing of sufficient length to prevent the material from massing in front of the blades.

2. In a multiple hearth furnace for drying and heat treating sticky mineral mud, comprising, a rotating shaft having at least three radial rabble arms, at least two rabble blades attached to and projecting downwardly from each arm, the planes of the blades on the several arms being inclined in the same direction with respect to the axes of the arms and the direction of rotation, each blade on a following arm overlapping the path of the corresponding blades on the arm immediately in advance whereby a continuous, radial movement of the mineral mud is attained, means for securing the blades to the arms and for holding them in a predetermined fixed relation during operation, the blades on the several arms being longitudinally spaced in such a manner that the distance between corresponding points on adjacent blades will be substantially equal to the effective width of the blades minus the overlap, multiplied by the number of arms, whereby a continuous radial displacement of the mineral mud can be effected with a blade spacing of sufficient length to prevent the massing of material in the space between adjacent blades.

ROBERT H. ABBOTT.
THOMAS A. DICKSON.